(12) United States Patent
Doerr et al.

(10) Patent No.: US 10,209,539 B1
(45) Date of Patent: Feb. 19, 2019

(54) SUBSTRATE CAVITY (71) Applicant: ACACIA COMMUNICATIONS, INC., Maynard, MA (US)

(72) Inventors: Christopher Doerr, Middletown, NJ (US); Long Chen, Marlboro, NJ (US); John Heanue, Manchester, MA (US); Momchil T. Mihnev, Matawan, NJ (US)

(73) Assignee: Acacia Communications, Inc., Maynard, MA (US)

( * ) Notice: Subject to any disclaimer, the term of this patent is extended or adjusted under 35 U.S.C. 154(b) by 0 days.

(21) Appl. No.: 15/858,051

(22) Filed: Dec. 29, 2017

(51) Int. Cl.
*G02F 1/01* (2006.01)

(52) U.S. Cl.
CPC ............ *G02F 1/0147* (2013.01); *G02F 1/011* (2013.01); *G02F 2001/0113* (2013.01)

(58) Field of Classification Search
None
See application file for complete search history.

(56) References Cited

U.S. PATENT DOCUMENTS 6,847,750 B1 * 1/2005 Baumann ................ G02F 1/011
385/129

* cited by examiner

*Primary Examiner* — Jerry Rahll
(74) *Attorney, Agent, or Firm* — Joseph D'Angelo (57) ABSTRACT

A method for making an apparatus, a system, and apparatus, the apparatus and system each comprising a substrate with a top side, wherein the substrate has a set of cavities in the top side of the substrate, wherein the substrate has a set of conductive elements on the top side of the substrate arranged to electrically couple with a set of conductive elements of a photonic integrated circuit (PIC), wherein each cavity of the set of cavities when coupled to the PIC creates a surface tension when exposed to an underfill to cause the underfill to flow around each cavity.

20 Claims, 6 Drawing Sheets

SUBSTRATE CAVITY

BACKGROUND

Typically electronic circuits may use flip-chip bonding with an underfill to bond an electronic die to a substrate. Generally, a chip or electronic circuit may have a set of bumps or pillars. Usually, the chip may be attached to a substrate or board. Conventionally, a chip is flipped over and the bumps or pillars attach to a substrate. Usually bumps or pillars may be connected with solder, thermocompression, or thermosonic adhesion. Typically, an underfill may be used to further adhere or attach the chip to the substrate. Usually, the underfill is a liquid type epoxy and inserted to flow in a gap between a chip and board or substrate surrounding bumps or pillars that electrically connect the chip to the substrate or board. Often, an underfill is not conductive and does not carry electricity between bumps or pillars.

SUMMARY

A method for making an apparatus, a system, and apparatus, the apparatus and system each comprising a substrate with a top side, wherein the substrate has a set of cavities in the top side of the substrate, wherein the substrate has a set of conductive elements on the top side of the substrate arranged to electrically couple with a set of conductive elements of a photonic integrated circuit (PIC), wherein each cavity of the set of cavities when coupled to the PIC creates a surface tension when exposed to an underfill to cause the underfill to flow around each cavity.

DETAILED DESCRIPTION

In certain embodiments of the current disclosure, an optical chip or photonic integrated circuit (PIC) may be attached to a substrate or board. In certain embodiments, a substrate may be made of ceramic. In other embodiments, a substrate may be organic. In most embodiments, a substrate may have electronic routing lines embedded in the substrate. In certain embodiments, a substrate may be a mini circuit board.

In most embodiments, a PIC may have a set of bumps or pillars that may be bonded to the substrate. In many embodiments, bumps or pillars may electrically connect a PIC and a substrate. In certain embodiments a PIC and a substrate may be bonded with solder. In other embodiments, a PIC may be bonded to a substrate in a thermosonic or thermocompression manner.

In many embodiments, a substrate and a PIC may have different thermal expansion properties. In most embodiments, differences in the thermal expansion properties may put stress on the bumps or pillars connecting a PIC and a substrate. In most embodiments, addition of an underfill to further attach a substrate to a PIC may even out stress caused by the difference in the thermal properties of the PIC and substrate. In many embodiments, evening out stress caused by the difference in thermal properties of the PIC and substrate may reduce stress on the rods or connectors.

In many embodiments, optical chips such as a PIC may use thermo-optic phase shifters (TOPS). In most embodiments, a TOPS may be a heater placed in proximity to a section of a silicon waveguide. In certain embodiments, a waveguide may be a conduit to transmit, guide or steer light. In many embodiments, a waveguide may have a material of a refractive index n1 embedded in another material of a lower refractive index n2. In most embodiments, as n1>n2, the light will be trapped within the waveguide confined by multiple total internal reflections at the boundaries.

In most embodiments, heating up a waveguide may cause the waveguide to operate in a preferred manner. In certain embodiments, heating up a waveguide may cause the waveguide to reflect more light or better reflect light of a different frequency. In certain embodiments, heating material that makes up a waveguide may change a bandgap for that material.

In most embodiments, pairing one or more TOPS to a waveguide may enable the waveguide to operate more efficiently. In most embodiments, a TOPS may operate more efficiently if surrounded by air. In most embodiments, a TOPS may be fabricated on a PIC to include a TOPS cavity. In many embodiments, a TOPS cavity may provide a cavity for the TOPS to be at least partially surrounded with air to facility efficient functioning of the TOP.

In many embodiments, if a TOPS is surrounded by a material with a higher thermal conductivity than air then the TOPS may not operate as efficiently. In most embodiments, a material such as an underfill has a thermal conductivity higher than air. In many embodiments, if a TOPS is surrounded by an underfill, then the TOPS may have a reduced power efficiency of a factor of typically 3-6. In most embodiments, using an underfill to attach a substrate to a PIC may decrease the efficiency of any TOPs on the PIC if the substrate comes in contact with the TOPS or fills a TOPS cavity. In almost all embodiments, lower power consumption may be beneficial to a PIC and an overall system. In many embodiments, operating more efficiency by lowering power use is preferable in most systems.

In most embodiments, the current disclosure recognizes that using the previous techniques of an underfill to attach a substrate to a PIC may result in the underfill filling in a TOPS cavity, which may result in the TOPS operating in an inefficient manner. In further embodiments, the current disclosure recognizes that it would be beneficial to use an underfill to adhere a PIC and a substrate together to decrease the stress on the connecting bumps or pillars while not having the underfill fill the TOPS cavity.

In many embodiments, the current disclosure may accomplish the use of an underfill without filling the TOPS cavity. In certain embodiments, the current disclosure may accomplish the use of an underfill without filling the TOPS cavity by creating a cavity in a substrate below TOPs heaters in a PIC attached to the substrate. In most embodiments, a PIC may be attached to a substrate using bumps or pillars and, in some embodiments, solder. In certain embodiments, once the pillars or bumps of a PIC are connected to a substrate there may be a distance of 50-100 μm between the substrate and the PIC. In many embodiments, once a PIC and a substrate are electrically coupled, the PIC and the substrate may planes may be separated by an air gap other than as connected by the conductive elements. In many embodiments, bumps or pillars may leave a plane of a PIC and connect to conductive elements of a substrate forming an electric connection without a plane of the PIC touching a plane of the substrate.

In further embodiments, a substrate may have one or more cavities positioned below one or more TOPs heaters in the PIC. In many embodiments, when an underfill is inserted to flow between a PIC and a substrate, the underfill may to flow via capillary action between the PIC and the substrate but because of the surface tension of the liquid avoid filling in cavities in the substrate. In most embodiments, an underfill may not break a boundary due to the large surface tension of the liquid and may instead flow around the boundary. In most embodiments, underfill may act as a liquid and the surface tension of the underfill may cause the underfill to flow around the substrate cavity but otherwise fill a gap formed between a PIC and a substrate. In certain embodiments, where an underfill is used to adhere a PIC to a substrate but does not fill holes carved into the substrate, stress due to the differences between the thermal properties of the substrate and PIC may be spread across both the PIC and substrate and one or more cavities for one or TOPs may be maintained to enable a more efficient TOP.

In further embodiments, the current disclosure may be useful in bonding materials other than a substrate and a PIC where it is necessary to maintain an air gap around components in the materials. In a particular example, one or more of the techniques of the current disclosure may be useful in adhering a component to a PIC such as a driver. In other embodiments, it may be beneficial to use one or more of the current techniques when underfill is used and it is beneficial to maintain an air gap. In certain embodiments, the distance between a substrate and a PIC may be 30-40 microns. In some embodiments, a cavity in a substrate may be equal to or greater than 200 microns. In many embodiments, a cavity may be a rectangular hole in another material. In other embodiments, a cavity may be a spherical hole in another material. In other embodiments, a cavity may be any hole in another material.

In many embodiments, a cavity may be punched in a substrate. In other embodiments, a cavity may be mechanically cut. In further embodiments, a cavity may be laser cut in a substrate. In certain embodiments, there may be one cavity for a set of TOPs heaters. In other embodiments, there may be a different cavities cut in the substrate for each different TOPs heaters. In still further embodiments, there may be a grouping of TOPs heaters to a set of cavities. In certain embodiments, there may be a number of TOPs heaters per substrate cavity. In some embodiments, each substrate cavity may need to be 50 microns from another substrate cavity. In certain embodiments, a cavity may be a rectangular hole in a substrate. In other embodiments, hole in a substrate. In certain embodiments, a cavity may not have electrical routing lines in the cavity. In some embodiments, a cavity may have a bottom within a substrate. In other embodiments, a cavity may continue through the substrate. In certain embodiments, a cavity could complete go through the bottom of a substrate.

Figure 1A:
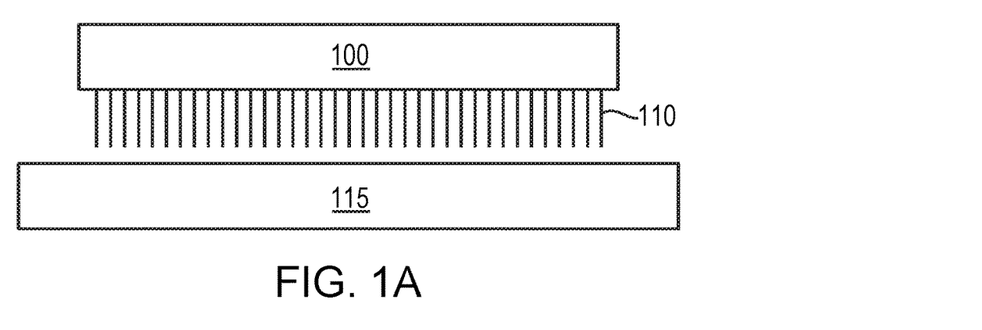
FIGS. 1a-1c are simplified illustrations of flip-chip bonding using an underfill, according to embodiments of the current disclosure.
Figure 1B:
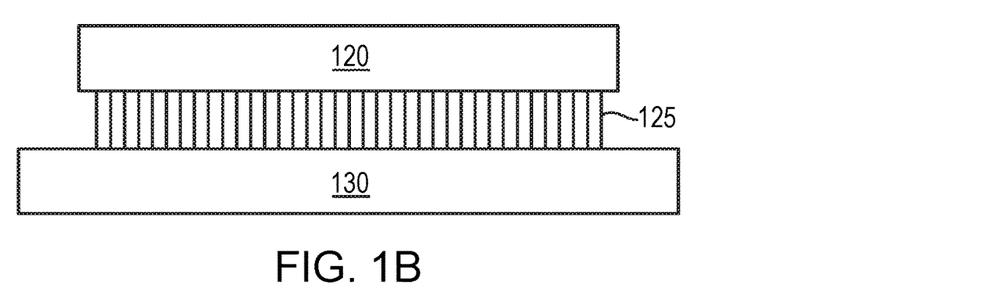
Figure 1C:
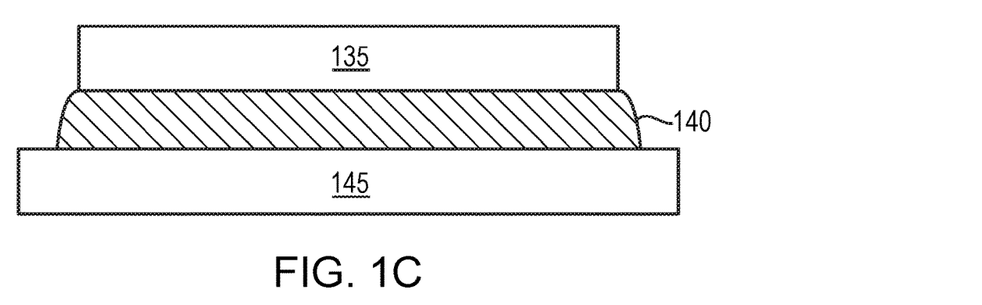

Refer now to the example embodiments of FIGS. 1a, 1b, and 1c. In FIG. 1a, chip 110 has bumps/pillars 110 and is positioned above substrate 115. FIG. 1a represents a cut away of a direct side view of chip 100, pillars 110 and substrate 115. If chip 100 were turned it would be visible that bumps/pillars 110 are arranged in a grid of R bumps/pillars in the x direction and T bumps/pillars in the Y direction. In FIG. 1b, chip 120 has been placed on substrate 130 so that bumps/pillars 125 come in contact with substrate 130. In the example embodiment of FIG. 1b, bumps/pillars 125 have been attached to substrate 130 through the use of solder. FIG. 1b represents a cut away of a direct side view of chip 120, bumps/pillars 125 and substrate 130. Specifically, if chip 120 were turned it would be visible that bumps/pillars 125 are arranged in a grid of R bumps/pillars in the x direction and T bumps/pillars in the Y direction. Refer now to the example embodiment of FIG. 1c, which shows that underfill 140 has been inserted between chip 135 and substrate 145 to provide additional adhesion. As well, in FIG. 1c, underfill 140 has covered bumps/pillars of chip 135 so that they are no longer visible. FIG. 1c represents a cut away of a direct side view of chip 135, underfill 140 and substrate 145.

Figure 2A:
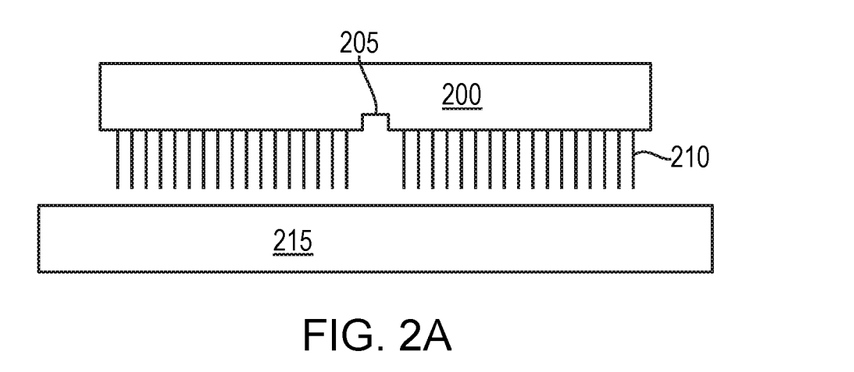
FIGS. 2a-2c are simplified illustrations of flip-chip bonding using an underfill where the underfill fills in a TOPs cavity, according to embodiments of the current disclosure.
Figure 2B:
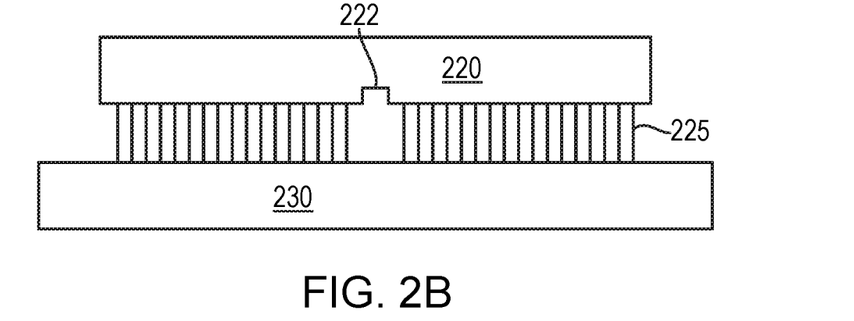
Figure 2C:
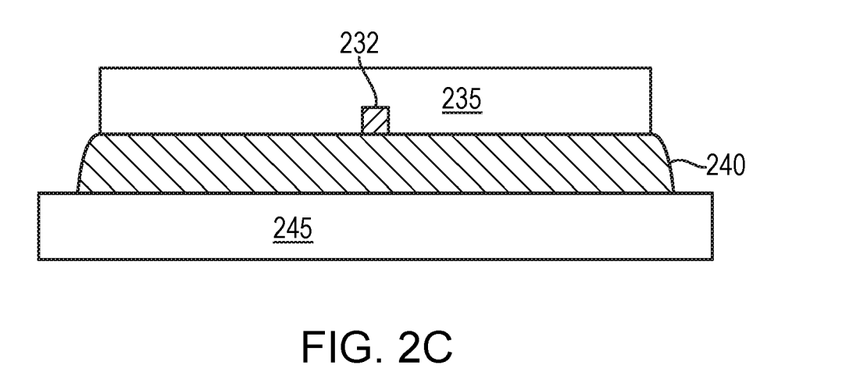

Refer now to the example embodiments of FIGS. 2a, 2b, and 2c. In FIG. 2a, chip 200 has pillars 210 and TOPs cavity 205 and is positioned above substrate 215. TOPs cavity 205 contains a TOPs heater and a waveguide. FIG. 2a represents a cut away of a direct side view of chip 210, bumps/pillars 210 and substrate 215. If chip 200 were turned it would be visible that bumps/pillars 210 are arranged in a grid of R bumps/pillars in the x direction and T bumps/pillars in the Y direction, accounting for any space needed for TOPs cavity 205. FIG. 2b, chip or PIC 220 has been placed on substrate 230 so that pillars 225 come in contact with substrate 230. In the example embodiment of FIG. 2b, tops cavity 222 is positioned over substrate 220. In the example embodiment of FIG. 2b, studs 225 have been attached to substrate 230 through the use of solder. FIG. 2b represents a cut away of a direct side view of chip 220, bumps/pillars 225 and substrate 230. Specifically, if chip 220 were turned it would be visible that bumps/pillars 225 are arranged in a grid of R bumps/pillars in the x direction and T bumps/pillars in the Y direction, accounting for any space needed for TOPS cavity 222. Refer now to the example embodiment of FIG. 2c, which shows that underfill 240 has been inserted between chip 235 and substrate 245 to provide additional adhesion. As well, in FIG. 2c, underfill 240 has covered pillars of chip 235 and has filled in TOPs cavity 235 so that they are no longer visible. In this embodiments, TOPs cavity 232 has provided an air gap around TOPS before the insertion of the underfill, but now the TOPs cavity is filled and the substrate has surrounded TOP. In this embodiment, the efficiency of the TOPs in TOPs cavity 205 has decreased due to the thermal conductivity of underfill 240. FIG. 2c represents a cut away of a direct side view of chip 235, underfill 240 and substrate 245.

Figure 3:
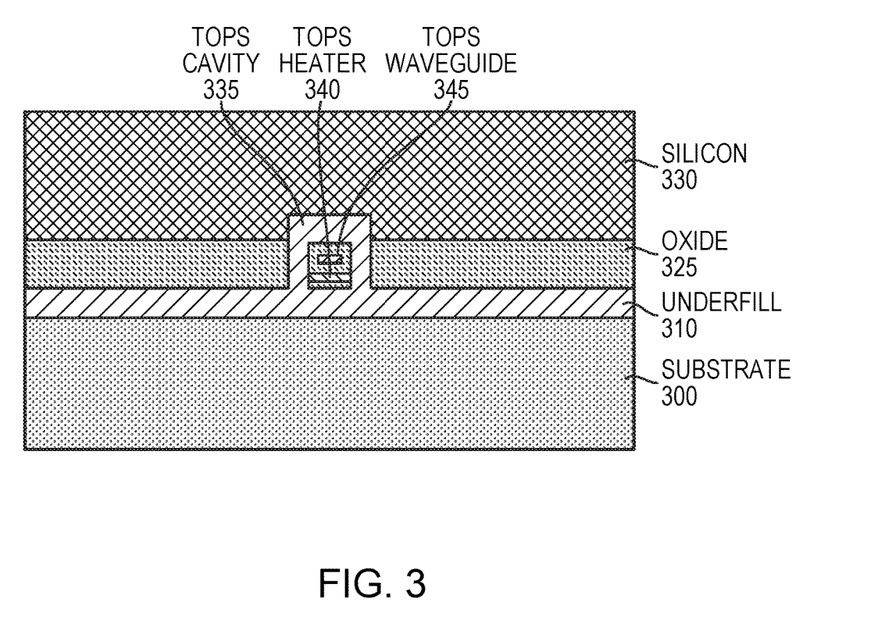
FIG. 3 is a simplified illustration of an alternative view of a flip-chip bonding where an underfill has filled in a TOPs cavity, according to an embodiment of the current disclosure.

Refer now to the example embodiment of FIG. 3, which illustrates an alternative embodiment of FIG. 2c showing a TOPs heater, TOPS Cavity and waveguide. The example embodiment of FIG. 3 shows an in depth illustration of how an underfill can fill a TOPs cavity. In the example embodiment of FIG. 3, underfill 310 has been inserted to adhere substrate 300 to oxide 325. In some embodiments, a substrate may be made of ceramic. In other embodiments, a substrate may be made of organic material. In further embodiments, a substrate may be made of glass. In still further embodiments, a substrate may be made of Silicon.

Returning to the example embodiment of FIG. 3, Oxide 325 is part of a chip or PIC. Oxide 325 is covered by silicon 330. In this example embodiment, TOPs cavity 335 has also been filled by underfill 310. TOPs cavity had been designed to provide an air gap or air insulation to TOPS heater 340, which altered the functionality of TOPs waveguide 345. In this example embodiment, as shown in FIG. 2c, underfill 310 has filled TOPS cavity 335. TOPs cavity 335 is filled with underfill 310 as the capillary action of underfill 310 is such that it is drawn into TOPs cavity 335 and the surface tension of underfill 310 is not sufficient to keep underfill 310 out of the cavity. In this example embodiment, the thermal conductivity of underfill 310 negatively impacts the functioning of TOPs heater 340 requiring additional power to enable TOPs heater function at the same efficiency compared to a TOPs cavity filled with air. FIG. 3 represents a cut away of a direct side view of substrate 300, underfill 310, oxide 325, silicon 330, TOPs cavity 335, TOPS heater 340, and TOPS waveguide 345.

Figure 4A:
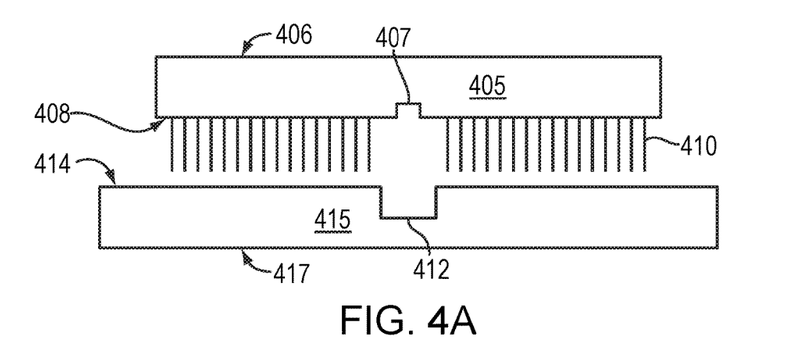
FIGS. 4a-4c are simplified illustrations of flip-chip bonding using a substrate cavity where an underfill does not fill the substrate cavity or a TOPs cavity, according to embodiments of the current disclosure.
Figure 4B:
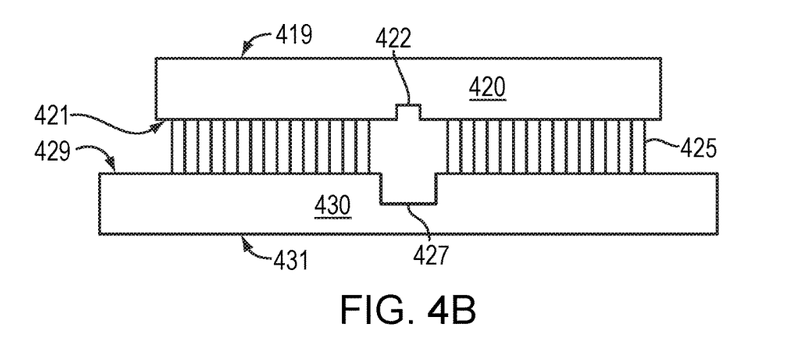

Refer now to the example embodiments of FIGS. 4a, 4b, and 4c. In FIG. 4a, chip 410 has pillars 410 and TOPs cavity 405 and is positioned above substrate 415 above substrate cavity 412. Plane 406 of substrate 405 is on the TOPS of substrate 405 and plane 408 is on the bottom of substrate 405. Bumps/pillars or connectors 410 are on the plane 408 at the bottom of substrate 405. FIG. 4a represents a cut away of a direct side view of chip 405, bumps/pillars 410 and substrate 415. Specifically, if chip 405 were turned it would be visible that bumps/pillars 410 are arranged in a grid of R bumps/pillars in the x direction and T bumps/pillars in the Y direction on plane 408, accounting for any space needed for TOPS cavity 407. TOPs cavity 405 contains a TOPs heater and a waveguide. In FIG. 4b, chip 420 has been placed on substrate 430 so that pillars 425 come in contact with substrate 430. In the example embodiment of FIG. 4b, tops cavity 422 is positioned over substrate cavity 427 on substrate 430. In the example embodiment of FIG. 4b, pillars 425 have been attached to substrate 430 through the use of solder. Plane 419 of substrate 405 is on the TOPS of substrate 420 and plane 421 is on the bottom of substrate 420. Bumps/pillars or connectors 425 are on the plane 421 at the bottom of substrate 420. FIG. 4b represents a cut away of a direct side view of chip 420, bumps/pillars 425 and substrate 430. Specifically, if chip 420 were turned it would be visible that bumps/pillars 425 are arranged in a grid of R bumps/pillars in the x direction and T bumps/pillars in the Y direction on plane 421, accounting for any space needed for TOPs cavity 422.

Figure 4C:
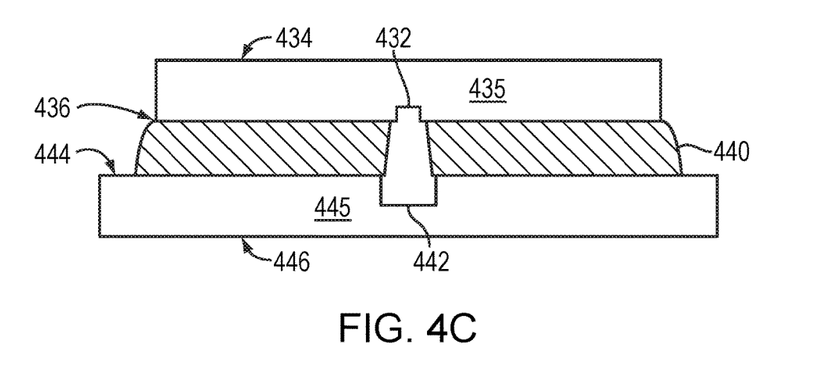

Refer now to the example embodiment of FIG. 4c, which shows that underfill 440 has been inserted between chip 435 and substrate 445 to provide additional adhesion. As well, in FIG. 4c, underfill 440 has covered pillars of chip 435. In FIG. 4c, underfill 440 has not entered substrate cavity 442 or TOPs cavity 432. Note, that FIG. 4c represents a cut away view of the side of chip 435, substrate 445, and underfill 440. In this embodiment, substrate cavity 442 has created a barrier for the substrate as the surface tension of the underfill is high enough that the open space of substrate 442 creates a barrier that underfill 440 does not pass. As TOPs cavity 432 is positioned above the space in substrate cavity 442, TOPs cavity 432 also does not become filled. In this embodiment, this enables TOPs cavity 432 to provide an air gap or air insulation to TOPs heater enabling it to operate more efficiently than if TOPs cavity 432 were covered by underfill 440. FIG. 4c represents a cut away of a direct side view of chip 435, underfill 440 and substrate 445. An alternative view of FIG. 4c may be seen in FIGS. 5a-d.

Refer now to the example embodiment of FIG. 5 a. FIG. 5a represents a side cut away view of FIG. 4c removing the PIC. In the example embodiment of 5a, underfill 510 is covering substrate 500 except for the portion of substrate 515 that has substrate cavity 500. Refer now to the example embodiment of FIG. 5b, which represents a TOPS view of FIG. 5a. Underfill 510 is covering a rectangular portion of substrate 500 except for where substrate cavity 515 exists. Refer now to the examples embodiments of FIGS. 5c and 5d, which represent a 3 dimensional side view and a TOPS view of FIG. 4c including PIC 520. In the example embodiment of FIG. 5c, underfill 510 has created a layer between PIC 520 and substrate 500. In the example embodiment of FIG. 5c substrate cavity 515 is not visible. FIG. 5d represents a TOPS view of PIC 520, underfill 510 extending slightly beyond PIC 520, and substrate 500 below and extending beyond underfill 510 and PIC 520.

Figure 5A:
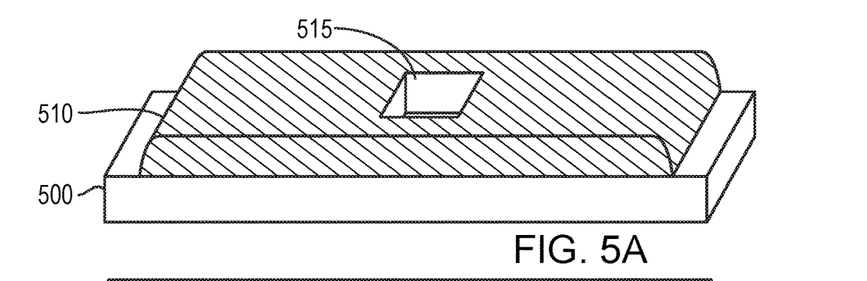
FIGS. 5a-5e are alternative simplified illustrations of flip-chip bonding using a substrate cavity where an underfill does not fill the substrate cavity or a TOPs cavity, according to embodiments of the current disclosure.
Figure 5B:
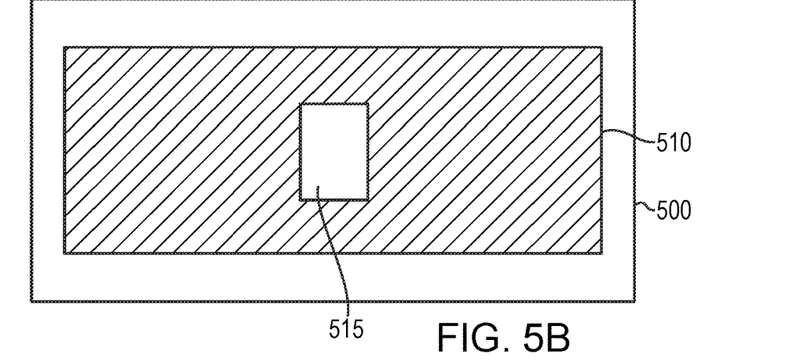
Figure 5C:
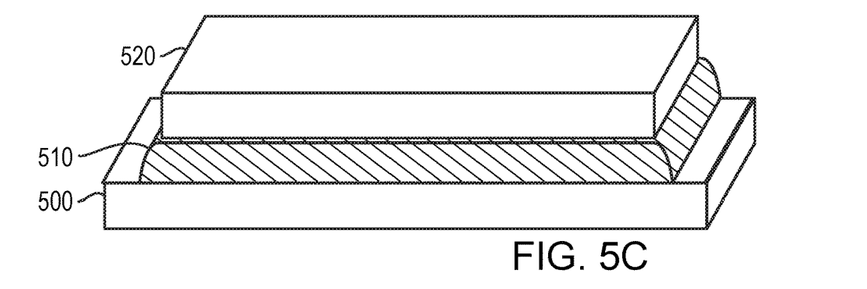
Figure 5D:
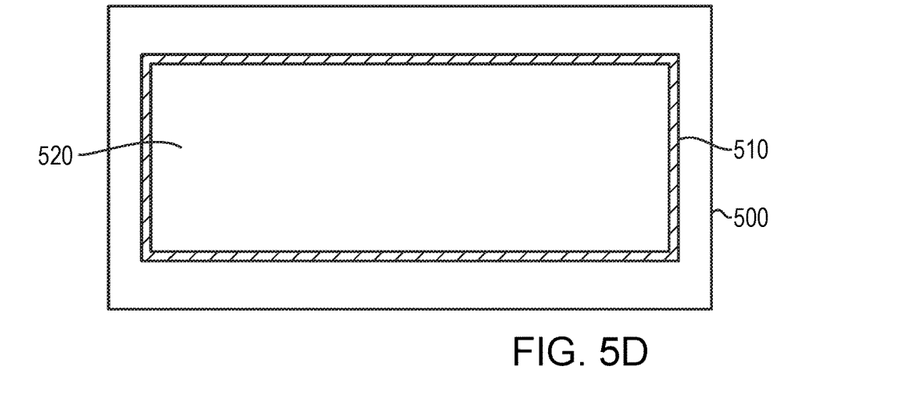
Figure 5E:
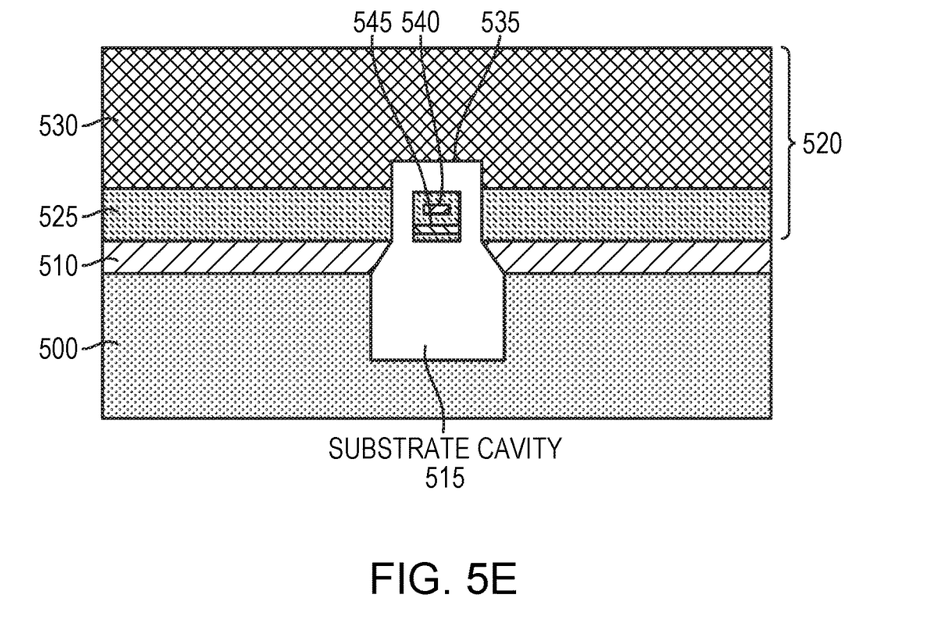

Refer now to the example embodiment of FIG. 5e, which represents a close up of the substrate cavity and TOPS cavity of FIG. 4c as a cutaway. Substrate 500 has substrate cavity 515. Above substrate 515, except for the location of substrate cavity 515 is underfill 510. Above substrate cavity is TOPs cavity. Inside TOPs cavity 535 is waveguide 540 and TOPs heater 545. Above underfill 510 and below silicon 530 is oxide 525. In this Figure, oxide 525 is also cut by TOPs cavity to create an air gap around TOPs heater 545.

The invention claimed is:

1. A method comprising:
creating a set of cavities in a substrate; wherein the substrate has a set of conductive elements arranged to electrically couple with a set of conductive elements of a photonic integrated circuit (PIC); wherein upon electrically coupling the PIC above the substrate each of the set of cavities are located proximately below each of a set of one or more TOPS in the photonic integrated circuit (PIC); wherein when exposed to an underfill, the ratio of a distance between the PIC and a depth of each cavity of the set of cavities in the substrate results in a surface tension in the underfill causing the underfill to flow around each cavity of the set of cavities in the substrate avoiding each TOPS of one or more TOPS in the PIC resulting in a cavity without underfill below each TOPS of the set of TOPS of the PIC.

2. The method of claim 1 wherein at least one cavity of the set of cavities is at least 200 microns deep.

3. The method of claim 1 further comprising:
electrically connecting the photonic integrated circuit (PIC) to the substrate; wherein the electrically connecting includes connecting conductive elements of the PIC to conductive elements of the substrate; upon electrically connecting the conductive elements of the PIC and the conductive elements of the substrate, the PIC is located above the substrate.

4. The method of claim 3 further comprising:
applying an underfill to flow between a portion of the PIC and the substrate to surround the conductive elements electrically connecting the PIC and the substrate.

5. The method of claim 4 wherein the conductive elements of the PIC are arranges in a grid formation excluding the locations of the set of TOPs heaters.

6. The method of claim 1 wherein the underfill flows via capillary action.

7. The method of claim 1 wherein the underfill acts as a liquid.

8. The method of claim 1 wherein the ratio of the distance between the substrate to the PIC and the depth of a cavity is less than 1 to 5.

9. An apparatus comprising:
a substrate with a top side; wherein the substrate has a set of cavities in the top side of the substrate; wherein the substrate has a set of conductive elements on the top side of the substrate; and
a photonic integrated circuit (PIC); wherein the PIC has a set of conductive elements and a set of TOPS; wherein the PIC is positioned over the substrate so that the conductive elements of the PIC are electrically connected to the conductive elements of the substrate; wherein each cavity of the set of cavities of the substrate are positioned below one or more of the TOPS of the set of TOPS of the PIC; wherein when exposed to an underfill, the ratio of a distance between the PIC and a depth of each cavity of the set of cavities in the substrate results in a surface tension in the underfill causing the underfill to flow around each cavity of the set of cavities in the substrate avoiding each TOPS of one or more TOPS in the PIC resulting in a cavity without underfill below each TOPS of the set of TOPS of the PIC.

10. The apparatus of claim 9 wherein the ratio of the distance between the substrate to the PIC and the depth of a cavity is less than 1 to 5.

11. The apparatus of claim 9 wherein when exposed to the underfill, the underfill flows via capillary action.

12. The apparatus of claim 9 further comprising an underfill positioned between the substrate and the PIC excluding each cavity of the set of cavities.

13. The apparatus of claim 12 wherein each cavity of the set of cavities is at least 200 microns deep.

14. The apparatus of claim 13 wherein each cavity of the set of cavities is at least 50 microns from any other cavity of the set of cavities.

15. The apparatus of claim 9 wherein when exposed to the underfill, the underfill acts as a liquid.

16. A system comprising:
a substrate with a top side; and
an underfill; wherein the substrate has a set of cavities in the top side of the substrate; wherein the substrate has a set of conductive elements on the top side of the substrate arranged to electrically couple with a set of conductive elements of a photonic integrated circuit (PIC); wherein each cavity of the set of cavities when coupled to the PIC creates a surface tension when exposed to an underfill to cause the underfill to flow around each cavity.

17. The system of claim 16 wherein the substrate upon electrically coupling the PIC above the substrate each of the set of cavities in the substrate are located proximately below each of a set of TOPS in the photonic integrated circuit (PIC).

18. The system of claim 16 further comprising the PIC.

19. The system of claim 18 wherein the PIC is electrically connecting to the substrate;
wherein the conductive elements of the PIC are electronically coupled to conductive elements of substrate; and
wherein other than the conductive elements the PIC is placed above the substrate.

20. The system of claim 19 further comprising:
an underfill; wherein the underfill is positioned between a portion of the PIC and the substrate to surround the conductive elements electrically connecting the PIC and the substrate; and wherein the underfill substantially surrounds a perimeter of each cavity of the set of cavities creating an air cavity below each TOPS of the set of TOPS of the PIC.

* * * * *